United States Patent
Hsu

(10) Patent No.: US 9,191,471 B2
(45) Date of Patent: Nov. 17, 2015

(54) WIRELESS COMMUNICATION DEVICE

(71) Applicant: Chiun Mai Communication Systems, Inc., New Taipei (TW)

(72) Inventor: Cho-Kang Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 90 days.

(21) Appl. No.: 14/141,485

(22) Filed: Dec. 27, 2013

(65) Prior Publication Data

US 2014/0378190 A1     Dec. 25, 2014

(30) Foreign Application Priority Data

Jun. 21, 2013   (TW) .............................. 102122140 A

(51) Int. Cl.
| | |
|---|---|
| *H04M 1/00* | (2006.01) |
| *H04M 1/02* | (2006.01) |
| *H01Q 1/24* | (2006.01) |
| *H01Q 5/35* | (2015.01) |

(52) U.S. Cl.
CPC ............. *H04M 1/0202* (2013.01); *H01Q 1/243* (2013.01); *H01Q 5/35* (2015.01)

(58) Field of Classification Search
CPC .............................. H01Q 1/24; H04M 1/0202
USPC .......... 455/550.1, 556.1, 67.11, 575.1, 575.3, 455/575.4, 575.5, 575.6, 575.8
See application file for complete search history.

(56) References Cited

U.S. PATENT DOCUMENTS

| | | | |
|---|---|---|---|
| 6,359,787 B1 * | 3/2002 | Peltolehto et al. ............ 361/752 |
| 6,421,547 B1 * | 7/2002 | Frohlund et al. ........... 455/575.3 |
| 6,483,719 B1 * | 11/2002 | Bachman ...................... 361/816 |
| 6,636,725 B1 * | 10/2003 | Yoshimoto ................ 455/575.7 |
| 7,647,079 B2 * | 1/2010 | Zuo et al. .................. 455/575.1 |
| 2003/0083018 A1 * | 5/2003 | Sadler et al. .................... 455/90 |
| 2007/0176830 A1 | 8/2007 | Winter |
| 2009/0033551 A1 * | 2/2009 | Hsu et al. ................. 342/357.06 |
| 2010/0203924 A1 * | 8/2010 | Hirota ........................... 455/566 |
| 2011/0193758 A1 * | 8/2011 | Liu et al. ....................... 343/767 |
| 2011/0230146 A1 * | 9/2011 | Morishita et al. .............. 455/77 |
| 2012/0127043 A1 * | 5/2012 | Imano et al. ................. 343/702 |
| 2013/0012127 A1 * | 1/2013 | Orihara et al. ............... 455/41.1 |
| 2013/0088404 A1 | 4/2013 | Ramachandran et al. |
| 2014/0376194 A1 * | 12/2014 | Daly ............................. 361/748 |

* cited by examiner

*Primary Examiner* — Babar Sarwar
(74) *Attorney, Agent, or Firm* — Novak Druce Connolly Bove + Quigg LLP

(57) ABSTRACT

A wireless communication device includes a housing, a circuit board, a first feed portion, a second feed portion, a third feed portion, and a ground portion. The housing includes a first conducting section, a separator section, and a second conducting section. The separator section insulates the first conducting section from the second conducting section. The first feed portion and the second feed portion are electronically connected between the circuit board and the first section. The third feed portion is spaced from the first section. The ground portion is electronically connected to the circuit board, the first section, and the second section.

12 Claims, 4 Drawing Sheets

WIRELESS COMMUNICATION DEVICE

BACKGROUND

1. Technical Field

The present disclosure relates to wireless communication devices, and particularly to a wireless communication device with an antenna structure for transmitting and receiving multiband radio signals.

2. Description of Related Art

Wireless communication devices, such as mobile phones, have antennas for transmitting and receiving radio signals. However, when housings of the wireless communication devices are made of metal, the metal housings may shield or interfere with radio signals of the antenna.

Therefore, there is room for improvement within the art.

BRIEF DESCRIPTION OF THE DRAWINGS

Many aspects of the present wireless communication device can be better understood with reference to the following drawings. The components in the various drawings are not necessarily drawn to scale, the emphasis instead being placed upon clearly illustrating the principles of the present wireless communication device.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
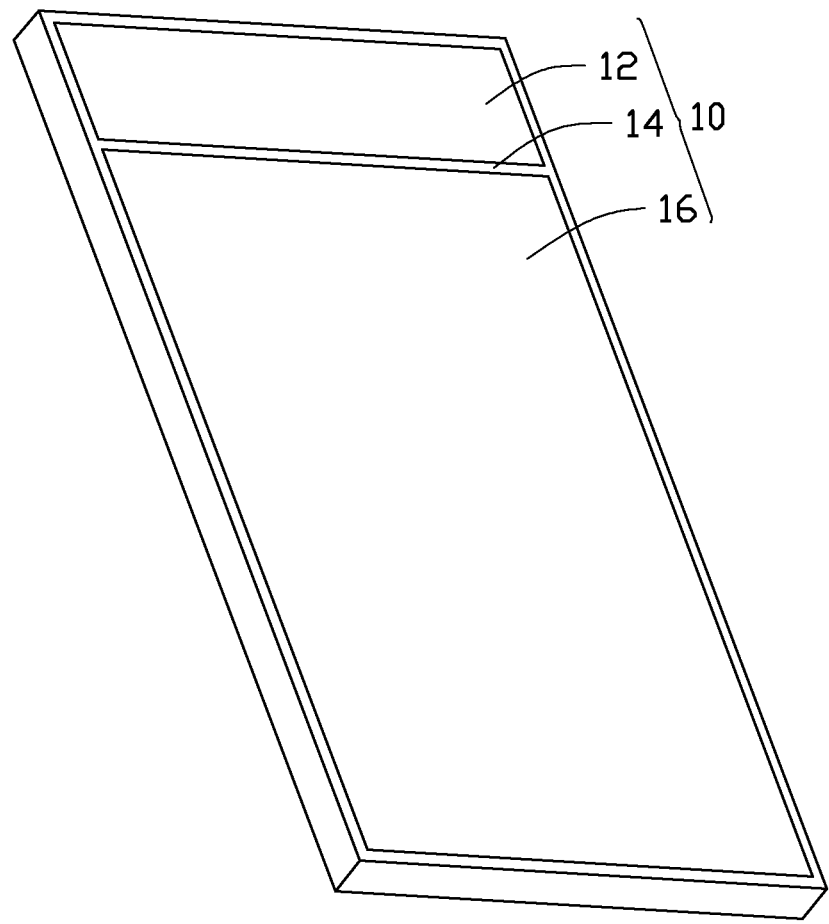
FIG. 1 is a schematic view of an embodiment of a wireless communication device.
Figure 2:
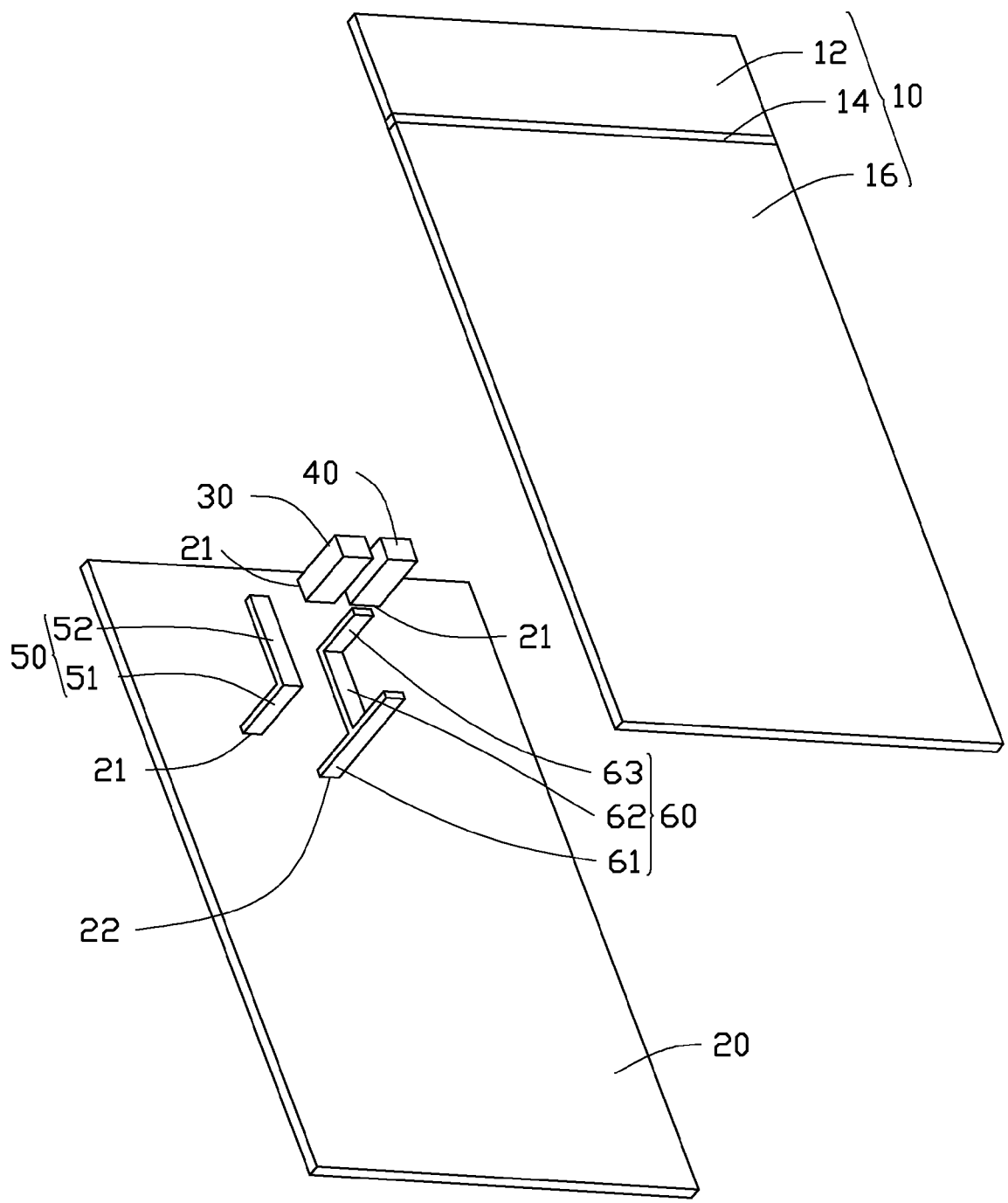
FIG. 2 is an exploded view of the wireless communication device of FIG. 1.

FIGS. 1 and 2 show an embodiment of a wireless communication device. In the illustrated embodiment, the wireless communication device is a mobile phone, but the disclosure is not limited thereto. The wireless communication device includes a housing 10, a circuit board 20, a first feed portion 30, a second feed portion 40, a third feed portion 50, and a ground portion 60. The first feed portion 30, the second feed portion 40, the third feed portion 50, and the ground portion 60 are located on the circuit board 20. The housing 10 covers the circuit board 20.

The housing 10 includes a first section 12, a separator section 14, and a second section 16. The separator section 14 is located between the first section 12 and the second section 16. In one embodiment, the first section 12 and the second section 16 are made of conductive material, such as metal, and the separator section 14 is made of non-conductive material, such as plastic. The separator section 14 insulates the first section 12 from the second section 14. In the illustrated embodiment, a size of the first section 12 is smaller than a size of the second section 14.

The circuit board 20 further includes three feed pins 21 and a ground pin 22. The three feed pins 21 are electronically connected to a radio frequency module (not shown) of the circuit board 20, which is configured to provide current to the housing 10. The ground pin 22 grounds the housing 10.

In one embodiment, the first feed portion 30 and the second feed portion 40 are made of metal and are spaced from each other. A first end of each of the first feed portion 30 and the second feed portion 40 is electronically connected to one respective corresponding feed pin 21, and a second end of each of the first feed portion 30 and the second feed portion 40 is electronically connected to the first section 12.

Figure 3:
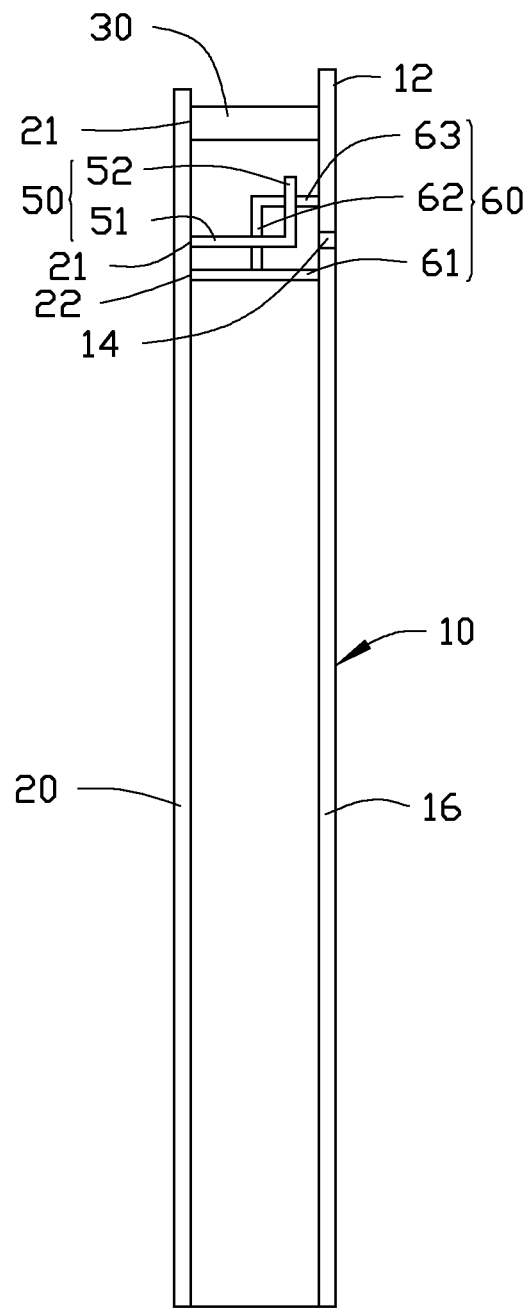
FIG. 3 is a side view of the wireless communication device of FIG. 1.

Referring to FIG. 3, the third feed portion 50 is electronically connected to a corresponding feed pin 21. The third feed portion 50 includes a first extending section 51 and a second extending section 52 connected substantially perpendicular to the first extending section 51. The first extending section 51 extends substantially perpendicularly from the circuit board 20 and is electronically connected to the corresponding feed pin 21. The second extending section 52 is substantially parallel to the circuit board 20. In the illustrated embodiment, a height of the first extending section 51 of the third feed portion 50 is less than a height of the first and second feed portions 30, 40. Thus, the second extending section 52 is spaced from the housing 10. Electric current flowing through the second extending section 52 is coupled to the first section 12 of the housing 10.

The ground portion 60 is spaced from the third feed portion 50 and located between the circuit board 20 and the housing 10. In one embodiment, the ground portion 60 includes a first ground section 61, a second ground section 62, and a third ground section 63. The first ground section 62 extends substantially perpendicularly from the circuit board 20. A first end of the first ground section 62 is electronically connected to the ground pin 22, and a second end of the first ground section 62 is electronically connected to the second section 16. The second ground section 62 extends substantially perpendicularly from a substantially middle portion of the first ground section 62 towards the first feed portion 30. The third ground section 63 extends substantially perpendicularly from a distal end of the second ground section 62, and is electrically connected to the first section 12.

A working process of the wireless communication device is illustrated below.

When electric current is supplied to the first feed section 30 through the corresponding feed pin 21, the current flows to the first section 12 of the housing 10. The current in the first section 12 further flows to the ground pin 22 through the third extending section 63, the second extending section 62, and the first extending section 61, thereby forming a first current path. The first current path receives and transmits wireless signals, such as GPS signals, at a first central frequency band. In the illustrated embodiment, the first central frequency band is about 1575 megahertz (MHZ). When the current is supplied to the second feed section 40 through the corresponding feed pin 21, the current flows to the first section 12. The current in the first section 12 further flows to the ground pin 22 of the circuit board 20 through the third extending section 63, the second extending section 62, and the first extending section 61, thereby forming a second current path. The second current path receives and transmits wireless signals, such as WIFI signals, at a second central frequency band. In the illustrated embodiment, the second central frequency band is about 800 MHZ. When the current is supplied to the third feed section 50 through the corresponding feed pin 21, the current flows to the second extending section 52. Because the second extending section 52 is spaced from the first section 12, the current in the second extending section 52 is electrically coupled to the first section 12, thereby forming a third current path. The third current path receives and transmits wireless signals, such as BT/WIFI signals, at a third central frequency band. In the illustrated embodiment, the third central frequency band is about 2400 MHZ.

Figure 4:
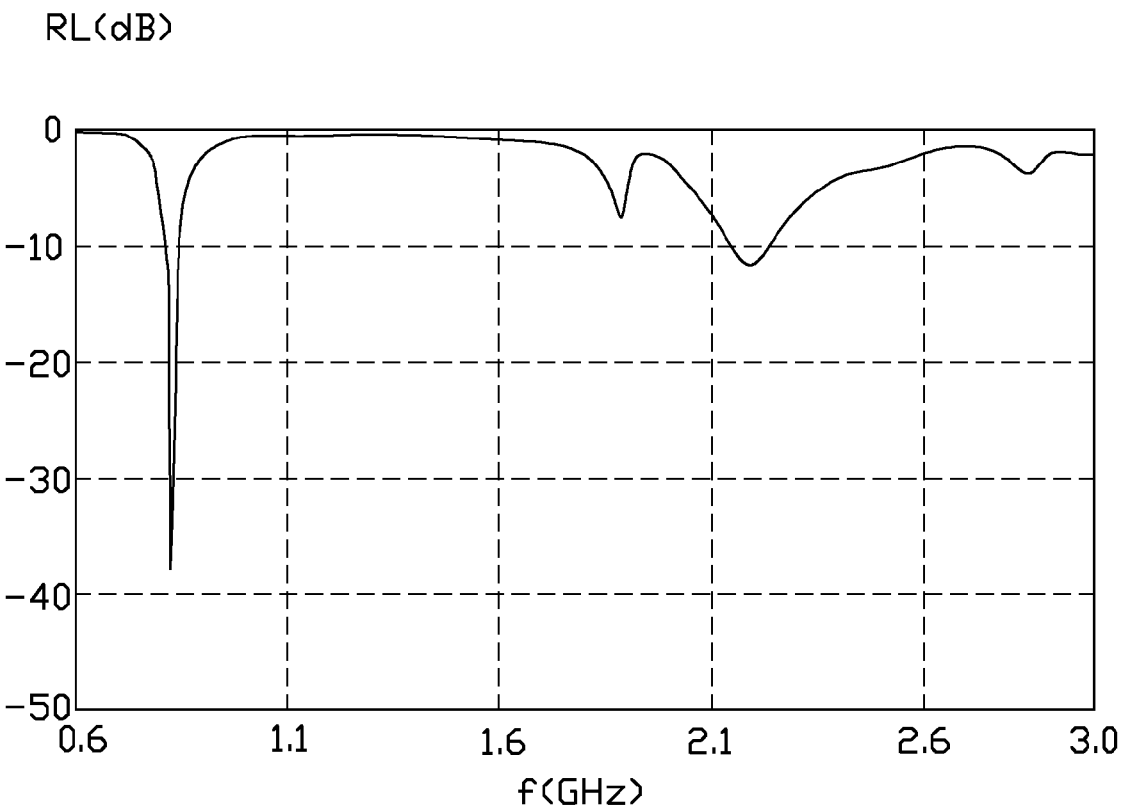
FIG. 4 is a return loss (RL) graph of wireless signals transmitted and received by the wireless communication device of FIG. 1.

FIG. 4 is a return loss (RL) graph of the wireless communication device. The wireless communication device has good performance when receiving/transmitting signals at the central frequency bands of about 800 MHz, about 1575 MHz, and about 2400 MHz.

In summary, the wireless communication device can receive/transmit multiband wireless signals through the housing 10, so additional antennas are not required. Thus, a required size of the wireless communication device is reduced, and the metal housing 10 does not interfere with communication signals.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A wireless communication device, comprising:
    a housing comprising a first conducting section, a separator section and a second conducting section, the separator section insulating the first conducting section and the second conducting section;
    a circuit board, wherein the circuit board includes a first feed pin, a second feed pin, and a third feed pin;
    a first feed portion, a second feed portion, a third feed portion, the first feed portion and the second feed portion electronically connected between the circuit board and the first conducting section, the third feed portion spaced from the first conducting section; and
    a ground portion electronically connected to the circuit board, the first conducting section and the second conducting section,
    wherein the first feed portion, the second feed portion, and the third feed portion are electronically connected to the first feed pin, the second feed pin, and the third feed pin, respectively.

2. The wireless communication device as claimed in claim 1, wherein the first feed portion is spaced from the second feed portion.

3. The wireless communication device as claimed in claim 1, wherein the third feed portion includes a first extending section and a second extending section perpendicular to the first extending section, the first extending section substantially perpendicularly extends from the circuit board, and the second extending section is parallel to the circuit board.

4. The wireless communication device as claimed in claim 3, wherein a height of the first extending section of the third feed portion is shorter than the first and second feed portions.

5. The wireless communication device as claimed in claim 1, wherein the circuit board has a ground pin, and the ground portion is electronically connected to the ground pin.

6. The wireless communication device as claimed in claim 5, wherein the ground portion includes a first ground section, a second ground section, and a third ground section, the first ground section is perpendicularly positioned on the circuit board, the second ground section substantially perpendicularly extends from a middle of the first ground section, the third ground section is perpendicular to the second ground section and is connected to the first section.

7. A wireless communication device, comprising:
    a housing comprising a first conducting section, a separator section and a second conducting section, the separator section insulating the first conducting section and the second conducting section;
    a circuit board;
    a first feed portion, a second feed portion, a third feed portion, the first feed portion and the second feed portion electronically connected between the circuit board and the first conducting section, the third feed portion spaced from the first conducting section; and
    a ground portion electronically connected to the circuit board, the first conducting section and the second conducting section,
    wherein the third feed portion includes a first extending section and a second extending section perpendicular to the first extending section, the first extending section substantially perpendicularly extends from the circuit board, and the second extending section is parallel to the circuit board.

8. The wireless communication device as claimed in claim 7, wherein the circuit board includes a first feed pin, a second feed pin, and a third feed pin; the first feed portion, the second feed portion, and the third feed portion are electronically connected to the first feed portion, the second feed portion, and the third feed portion, respectively.

9. The wireless communication device as claimed in claim 7, wherein the first feed portion is spaced from the second feed portion.

10. The wireless communication device as claimed in claim 7, wherein a height of the first extending section of the third feed portion is shorter than the first and second feed portions.

11. The wireless communication device as claimed in claim 7, wherein the circuit board has a ground pin, and the ground portion is electronically connected to the ground pin.

12. The wireless communication device as claimed in claim 11, wherein the ground portion includes a first ground section, a second ground section, and a third ground section, the first ground section is perpendicularly positioned on the circuit board, the second ground section substantially perpendicularly extends from a middle of the first ground section, the third ground section is perpendicular to the second ground section and is connected to the first section.

* * * * *